United States Patent
Walton et al.

(10) Patent No.: US 9,305,407 B1
(45) Date of Patent: Apr. 5, 2016

(54) METHOD FOR FLEET MANAGEMENT

(71) Applicants: Mark Adam Walton, Spring, TX (US); Eugene Thomas Johnson, Spring, TX (US)

(72) Inventors: Mark Adam Walton, Spring, TX (US); Eugene Thomas Johnson, Spring, TX (US)

(73) Assignee: MTCT GROUP LLC, Spring, TX (US)

( * ) Notice: Subject to any disclaimer, the term of this patent is extended or adjusted under 35 U.S.C. 154(b) by 0 days.

(21) Appl. No.: 14/657,231

(22) Filed: Mar. 13, 2015

Related U.S. Application Data

(60) Provisional application No. 62/109,029, filed on Jan. 28, 2015.

(51) Int. Cl.
G07C 5/00 (2006.01)
G07C 5/02 (2006.01)
G07C 5/08 (2006.01)
G01M 17/007 (2006.01)

(52) U.S. Cl.
CPC .............. G07C 5/02 (2013.01); G01M 17/007 (2013.01); G07C 5/08 (2013.01)

(58) Field of Classification Search
USPC ........................................................ 701/31.5
See application file for complete search history.

(56) References Cited

U.S. PATENT DOCUMENTS

| | | | |
|---|---|---|---|
| 5,680,328 A | 10/1997 | Skorupski et al. | |
| 6,714,894 B1 | 3/2004 | Tobey et al. | |
| 2006/0129691 A1* | 6/2006 | Coffee | H04L 67/04 709/230 |
| 2008/0125103 A1* | 5/2008 | Mock | G06F 17/3087 455/418 |
| 2008/0126111 A1* | 5/2008 | Loda | H04L 67/12 701/1 |
| 2010/0241501 A1* | 9/2010 | Marshall | G06Q 30/00 705/14.13 |
| 2011/0208389 A1* | 8/2011 | Tarte | B60K 35/00 701/36 |
| 2012/0123951 A1 | 5/2012 | Hyatt et al. | |
| 2012/0166346 A1 | 6/2012 | Machlab et al. | |

OTHER PUBLICATIONS

FleetLynx Fleet Management Solution Overview (http://fleetlynx.net/wp/wp-content/uploads/2014/08/overview.pdf).
Fleetmatics Program Screenshots (http://media.fleetmatics.com/product-screenshot-library/gallery/product-screenshots/reveal-screenshots).
Forward Thinking Systems Fleet Tracking Software Flyer (http://www.ftsgps.com/pdf/transportation-flier.pdf).
BigRoad Fleet Management Application Features (http://www.bigroad.com/features).
KeepTruckin Electronic Logs Application Features Overview (https://keeptruckin.com/tour).
TouchStar TS FleetMarshal Brochure (http://www.touchstargroup.com/wp-content/uploads/2014/08/TouchStar_FleetMarshal.pdf).
TrackFleet Features Overview (http://www.trackfleet.com/features/).
Feature Comparison Spreadsheet.

* cited by examiner

Primary Examiner — Yonel Beaulieu

(57) ABSTRACT

A method for fleet management can be created using a vehicle maintenance tracker for at least one vehicle and performing a vehicle inspection on the at least one vehicle using an inspection device to identify services needed on the vehicle. The vehicle inspection can then be transferred to a mechanic for verification of services needed on the vehicle. The vehicle inspection can provide a verification of services needed to the vehicle maintenance tracker and generate at least one of: vehicle repair information prioritized by importance of services, a schedule for vehicle service prioritized by importance of services needed, and a vehicle return to service date based on a schedule for vehicle service prioritized by importance of services needed.

19 Claims, 9 Drawing Sheets

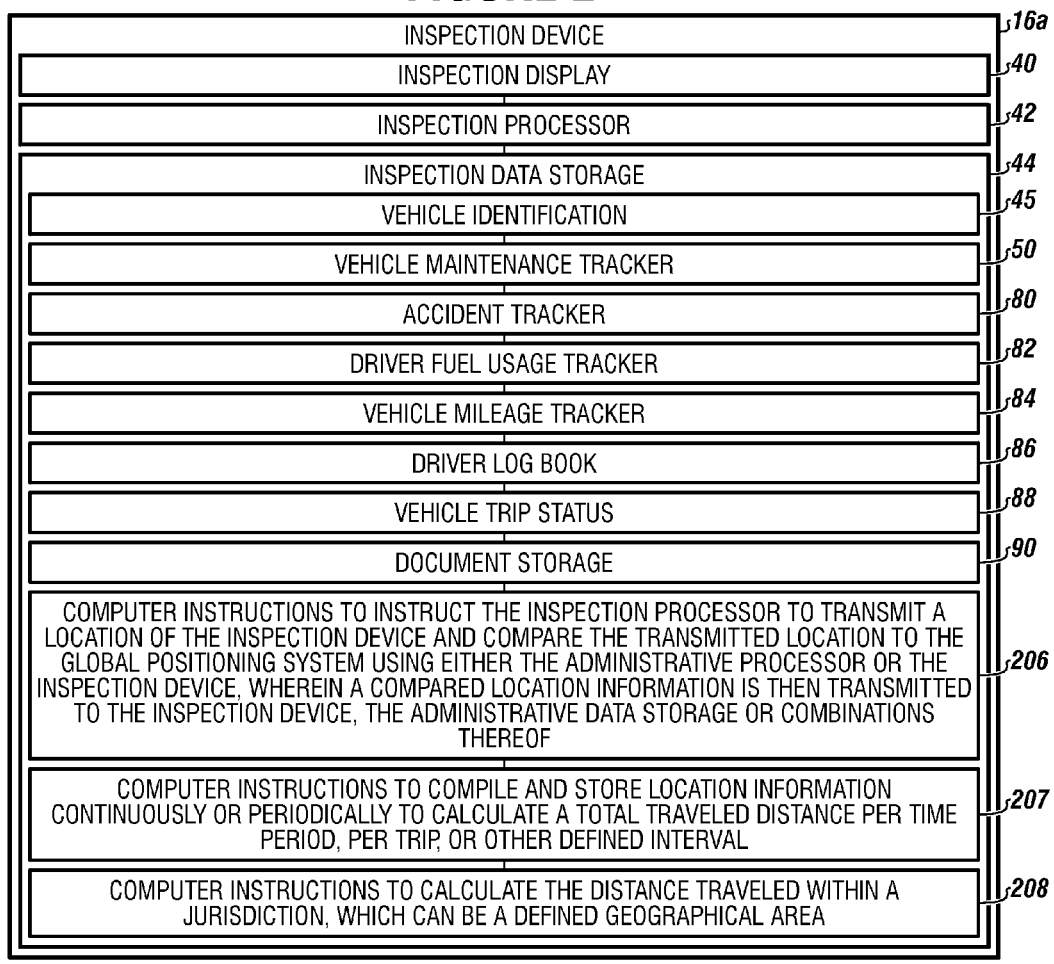

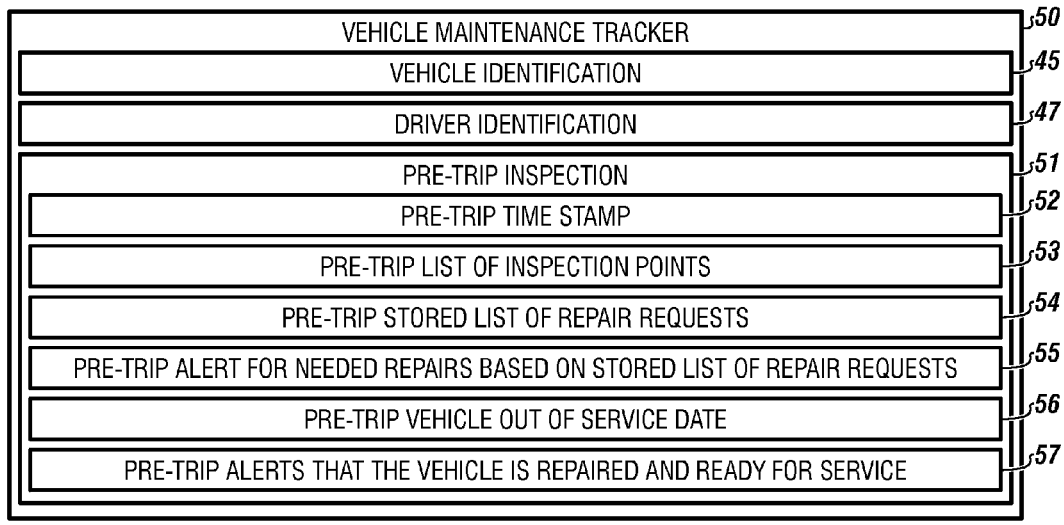
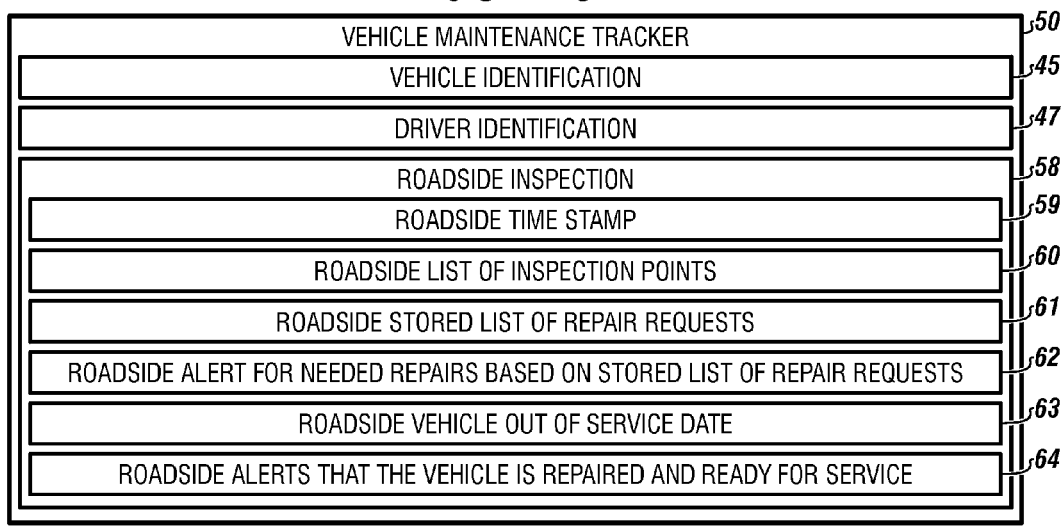

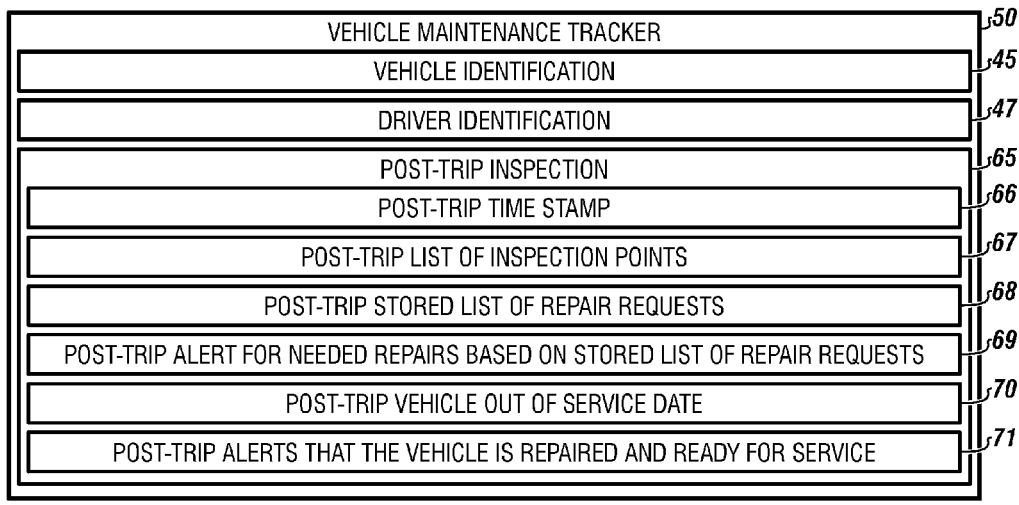
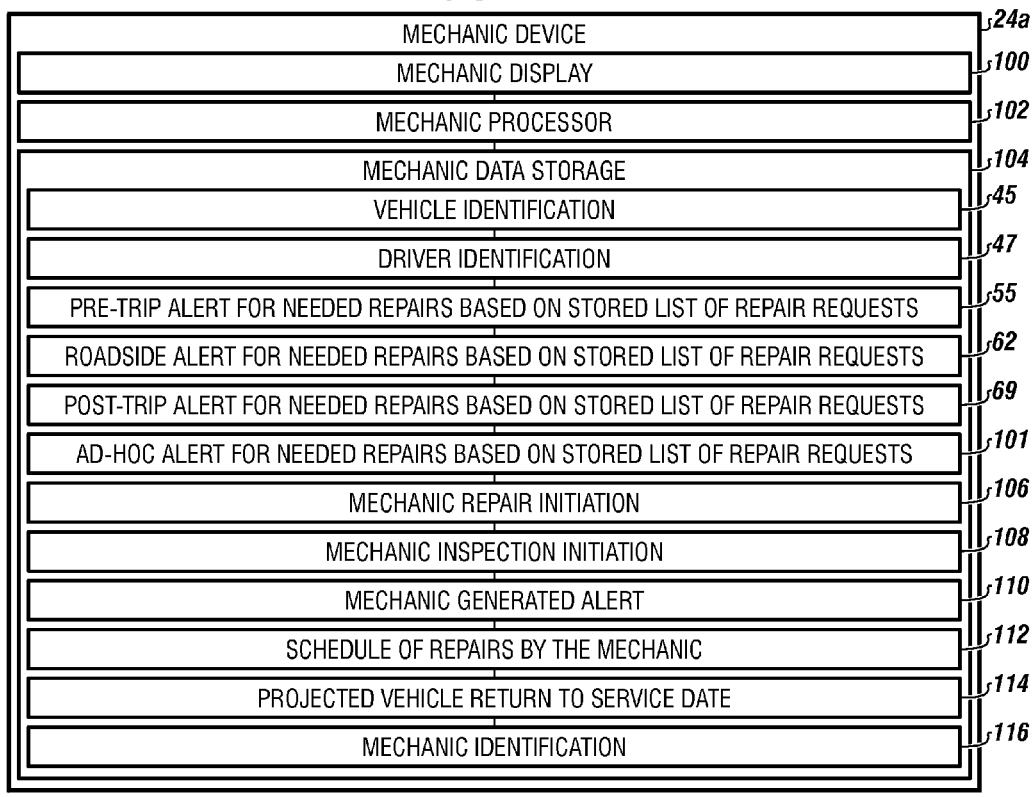

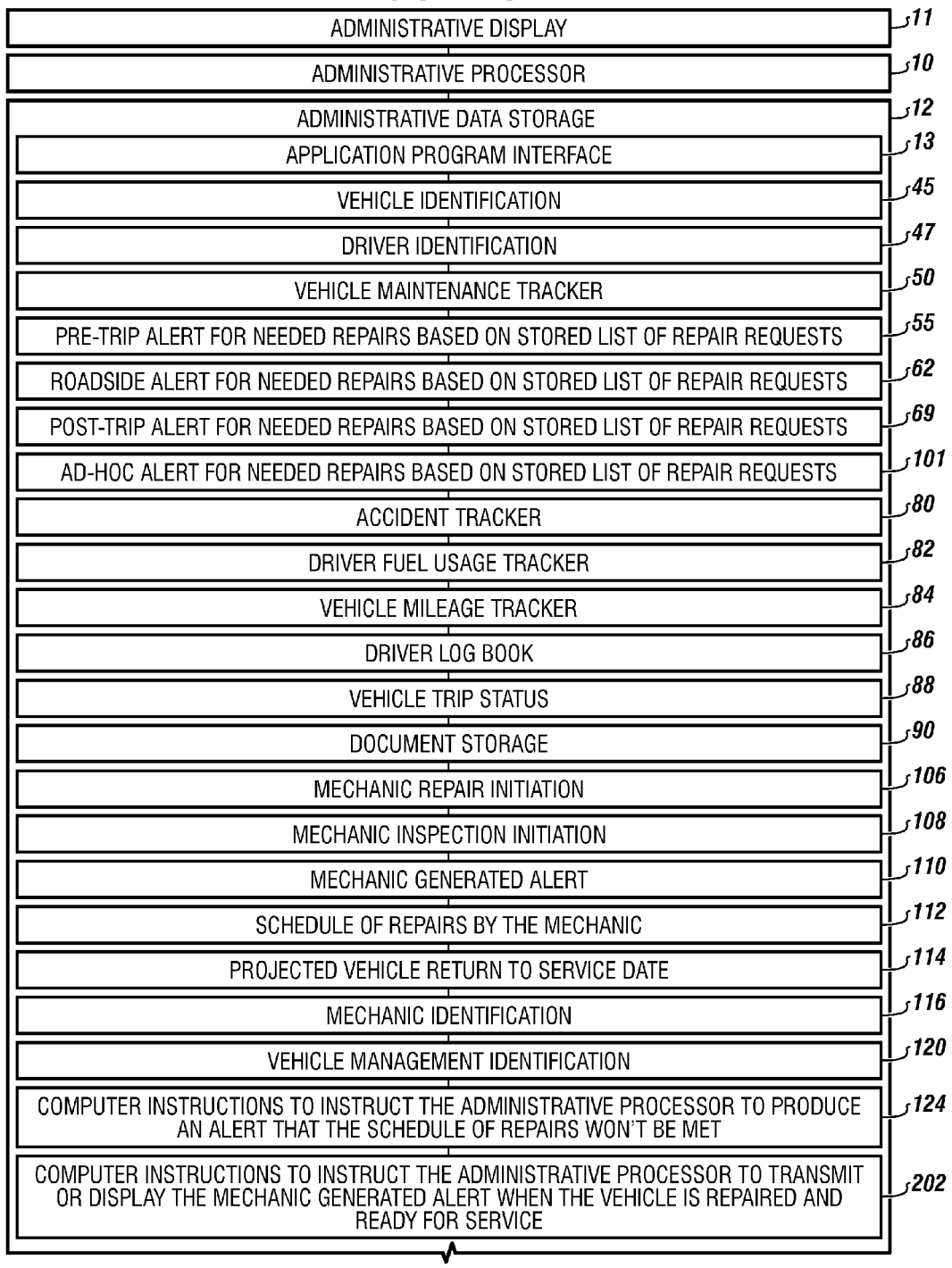

FIGURE 6

| | |
|---|---|
| CUSTOMER CLIENT DEVICE | 29 |
| VEHICLE MANAGEMENT DISPLAY | 31 |
| VEHICLE MANAGEMENT PROCESSOR | 30 |
| VEHICLE MANAGEMENT DATA STORAGE | 119 |
| VEHICLE IDENTIFICATION | 45 |
| DRIVER IDENTIFICATION | 47 |
| VEHICLE MAINTENANCE TRACKER | 50 |
| PRE-TRIP ALERT FOR NEEDED REPAIRS BASED ON STORED LIST OF REPAIR REQUESTS | 55 |
| ROADSIDE ALERT FOR NEEDED REPAIRS BASED ON STORED LIST OF REPAIR REQUESTS | 62 |
| POST-TRIP ALERT FOR NEEDED REPAIRS BASED ON STORED LIST OF REPAIR REQUESTS | 69 |
| AD-HOC ALERT FOR NEEDED REPAIRS BASED ON STORED LIST OF REPAIR REQUESTS | 101 |
| ACCIDENT TRACKER | 80 |
| DRIVER FUEL USAGE TRACKER | 82 |
| VEHICLE MILEAGE TRACKER | 84 |
| DRIVER LOG BOOK | 86 |
| VEHICLE TRIP STATUS | 88 |
| DOCUMENT STORAGE | 90 |
| MECHANIC REPAIR INITIATION | 106 |
| MECHANIC INSPECTION INITIATION | 108 |
| MECHANIC GENERATED ALERT | 110 |
| SCHEDULE OF REPAIRS BY THE MECHANIC | 112 |
| PROJECTED VEHICLE RETURN TO SERVICE DATE | 114 |
| MECHANIC IDENTIFICATION | 116 |
| VEHICLE MANAGEMENT IDENTIFICATION | 120 |
| COMPUTER INSTRUCTIONS TO GENERATE AND TRANSMIT OR DISPLAY AN ALERT THAT THE SCHEDULE OF REPAIRS WON'T BE MET | 124 |
| COMPUTER INSTRUCTIONS TO GENERATE AND TRANSMIT OR DISPLAY AN ALERT WHEN THE AT LEAST ONE VEHICLE IS REPAIRED AND READY FOR SERVICE | 125 |
| COMPUTER INSTRUCTIONS TO GENERATE AND TRANSMIT OR DISPLAY A VEHICLE RETURN TO SERVICE DATE | 126 |

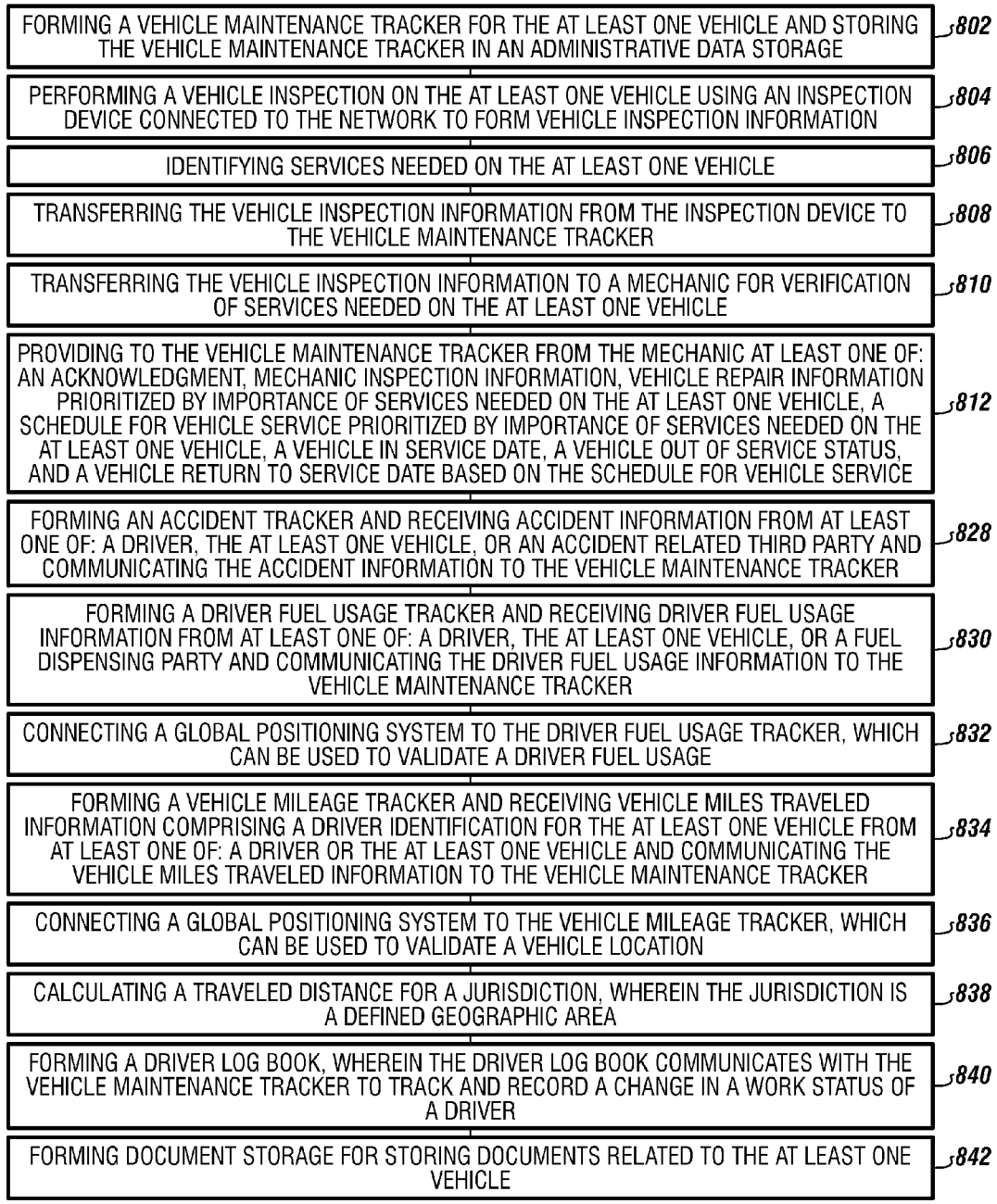

METHOD FOR FLEET MANAGEMENT

CROSS REFERENCE TO RELATED APPLICATION

The current application claims priority to and the benefit of U.S. Provisional Patent Application Ser. No. 62/109,029 filed Jan. 28, 2015, entitled "FLEET MANAGEMENT SYSTEM". This reference is hereby incorporated in its entirety.

FIELD

The present embodiments generally relate to a method for fleet management for tracking real time inspections of vehicles and maintenance of vehicles.

BACKGROUND

A need exists for methods for an enhanced fleet management system using devices for monitoring inspection and the repair status of vehicles.

A need exists for using at least one wireless communication devices, which can be connected by a network, to inspect and service one or more vehicles owned by a transportation company, such as a fleet.

A need exists for real time vehicle inspection date, pre-trip, post-trip, roadside or ad hoc inspections that include driver information and vehicle data which can be initiated by the driver of a vehicle using a communication device, such as a smart phone, so that vehicle inspections can be performed before, during, and after trips by the vehicle as it moves through different geographically defined communication service regions.

A need exists for owners of at least one vehicle or vehicle management companies to know when the at least one vehicle could be going out of service and when they can come back into service quickly, efficiently, using executive dashboards that can monitor a plurality of drivers and a plurality vehicles simultaneously.

The present embodiments meet these needs.

BRIEF DESCRIPTION OF THE DRAWINGS

The detailed description will be better understood in conjunction with the accompanying drawings as follows:

FIG. 2 depicts a driver client device usable with the method according to one or more embodiments.

FIGS. 3A-3C depict a vehicle maintenance tracker usable with the method according to one or more embodiments.

FIG. 4 depicts a mechanic client device usable with the method according to one or more embodiments.

FIGS. 5A and 5B depict an administrative processor usable with the method according to one or more embodiments.

FIG. 6 depicts a vehicle management processor usable with the method according to one or more embodiments.

FIG. 8 depicts the method according to one or more embodiments.

Figure 1:
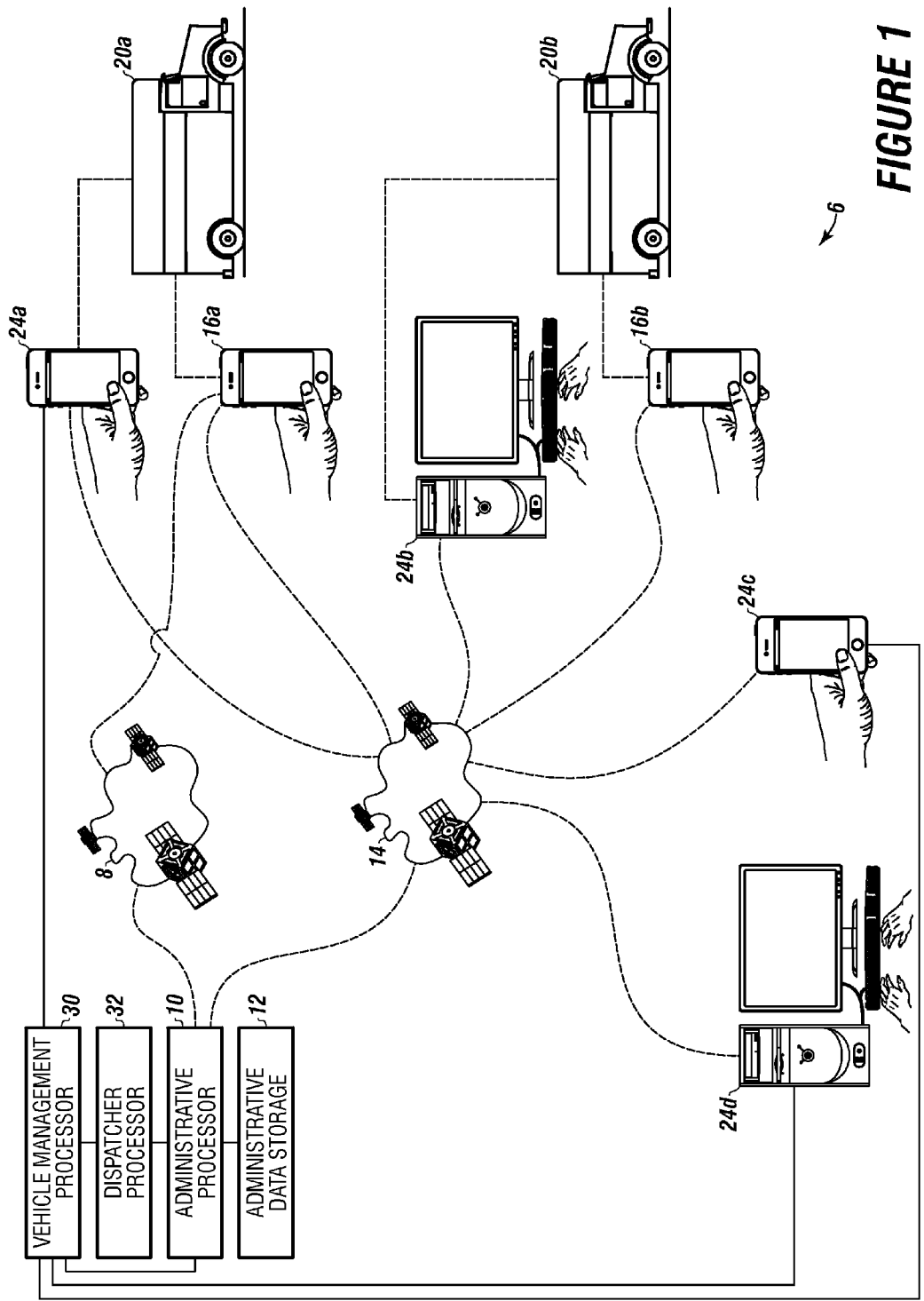
FIG. 1 depicts an overview of equipment usable to implement a fleet management method according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodiments relate to a method for fleet management that involves tracking in real time inspections of at least one vehicle and maintenance of the at least one vehicle using at least one inspection device, which can be connected to a network with an administrative processor.

The method for fleet management involves creating a vehicle maintenance tracker for at least one vehicle or a plurality of vehicles in the fleet.

The method can involve performing a vehicle inspection on at least one vehicle or a plurality of vehicles using an inspection device to identify services needed on the at least one vehicle and transfer the inspection information into a vehicle maintenance tracker.

The method can involve transferring the vehicle inspection information to a mechanic for verification of services needed on the at least one vehicle or the plurality of vehicles and then simultaneously providing a verification of services needed to the vehicle maintenance tracker while automatically generating at least one of: vehicle repair information prioritized by importance of services, wherein the prioritization is determined by at least one of: a driver, a mechanic or a predetermined priority order of importance for services needed stored in the data storage; a schedule for vehicle service prioritized by importance of services needed; and a vehicle return to service date based on a schedule for vehicle service prioritized by importance of services needed.

The fleet management method can be used for tracking at least one vehicle or a plurality of vehicles, with each vehicle having a vehicle identification.

The inspection device can be configured to transmit a vehicle identification, such as a vehicle identification number ("VIN"), and transmit vehicle inspection information, such as "dented passenger side front quarter panel", to an administrative processor.

The inspection device can communicate with the administrative processor, which can further communicate with an administrative data storage connected to the network.

The administrative data storage can be configured to receive vehicle identification and vehicle inspection information into a vehicle maintenance tracker, which can be an executive dashboard of at least one vehicle or of all vehicles in the fleet, which usable for tracking the at least one vehicle or the plurality of vehicles simultaneously.

The method can include using at least one mechanic device, which can be connected to the network.

The at least one mechanic device can be configured to automatically receive the vehicle identification and vehicle inspection information from the vehicle maintenance tracker and automatically transmit to the vehicle maintenance tracker at least one of: an acknowledgement of receipt, mechanic inspection information, vehicle repair information, such as this vehicle requires no repair, which can be inputted by a mechanic; the schedule for vehicle service, such as part will be ordered on Feb. 3, 2015 and installed on Feb. 7, 2015, which can be inputted by a mechanic; a vehicle in service date, such as the vehicle will be in service on Feb. 8, 2015, which can be inputted by a mechanic; a vehicle out of service status, such as out of service through Feb. 7, 2015 which can be inputted by a mechanic; and a vehicle return to service date, such as vehicle will be returned to service on Feb. 9, 2015, which can be inputted by a mechanic. In embodiments, the mechanic inputs can be made using the mechanic device.

The method can include providing a vehicle maintenance tracker that allows the status, such as inspections and repairs of the at least one vehicle of the plurality of vehicles to be viewed simultaneously. In embodiments, the inspection device, the mechanic device, and combinations thereof can be viewed in real time simultaneously for the at least one vehicle or the plurality of vehicles.

The embodiments further relate to a method of fleet management that can have a plurality of processors and a plurality of data storages, which can be connected by a network.

An example of one of the plurality of processors can be an administrative processor having an administrative data storage configured to receive information into the vehicle maintenance tracker in the administrative data storage for performing a pre-trip, post-trip, roadside, or ad-hoc inspection for a vehicle with a vehicle identification.

A benefit of the invention is that fewer accidents will occur due to a method for systemized inspections that are networked directly with mechanics forming a trackable monitoring system for when vehicles are in service or out of service by drivers, fleet owners, or combinations thereof.

A benefit of the invention can allow the driver or the fleet owner to view all the statuses of all the vehicles simultaneously and in real time, providing better predictability of vehicles being in service with more predictable revenue generation.

The term "fleet management system" as used herein can refer to a system usable with the method for managing a group of transportation vehicles or cargo vehicles, such as a taxi cab fleet, a tractor trailer fleet, other commercial motor vehicles (CMV), or a fleet of government vehicles. In embodiments, the system can manage a group of, but is not limited to, golf carts, boats, unmanned drones, or other types of recreational vehicles.

The term "inspection" as used herein can refer to a pre-trip inspection, a roadside inspection, a post-trip inspection or an ad-hoc inspection. In embodiments, the term inspection can include driver information, vehicle identification and vehicle inspection information, which can be initiated by the driver of the at least one vehicle using a communication device, so that vehicle inspections can be performed before, during, and after trips.

The term "administrative processor" as used herein can refer to a laptop, a computer, a portable hand held device, such as a cellular phone or a tablet computer, combinations thereof, or any device capable of at least two way communications. The administrative processor can communicate with at least one display.

The term "inspection device" as used herein can refer to a device which can be portable, such as a cellular phone, a camera, a tablet computer, a combination of digital input devices which enable both words and images to be captured simultaneously for a vehicle, or the like. The inspection device can be operated by an individual, such as a driver of a vehicle or a safety manager of a vehicle. In embodiments, the inspection device can be the mechanic device and/or the customer client device. The inspection device can have a plurality of sensors attached to a processor capable of bidirectional communication, such as an inspection robot. In embodiments, the inspection devices can be directly mounted on the vehicle and adapted to communicate with the vehicle onboard computer system to provide mileage, fuel usage, diagnostic information, routine maintenance information and accident information. The inspection device can communicate with at least one display.

The term "mechanic device" as used herein can refer to a device, which can be portable, such as a cellular phone, a camera, a tablet computer, a combination of digital input devices which enable both words and images to be captured simultaneously for a vehicle, the like or combinations thereof. The mechanic device can be operated by an individual, such as a mechanic. The mechanic device can communicate with at least one display.

The term "customer client device" used herein can refer to a portable device, such as a cellular phone, a laptop, a desk top computer, a tablet, a personal communication, combinations thereof, or any device capable of at least two way communications. In embodiments, the customer client device can be the inspection device and/or the mechanic device. The customer client device can be operated by an individual, such as a fleet owner, an employee of a company, or safety manager. The customer client device can be capable of bidirectional communication. The customer client device can have a sufficient memory storage area to allow a customer to view information from the at least one vehicle or all vehicles in a fleet simultaneously, or in priority grouping including information on vehicle mileage, fuel usage, diagnostic information, routine maintenance information and accident information from the vehicle maintenance tracker. The customer client device can store a vehicle maintenance tracker locally for periodic synchronization, or access a central vehicle maintenance tracker.

The term "data storage" as used herein can refer to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "dispatcher processor" as used herein can refer to a processing device which can be operated by a fleet dispatcher. In some instances, the dispatcher processor can be a cellular phone, a laptop, a desk top computer, a tablet computer, a personal communication device capable of processing, and combinations thereof. In embodiments, the dispatcher processor can be capable of at least two way communications.

The term "document storage" as used herein can refer to a storage area where all collected data from the system can be stored. The data can be stored on at least one of the data storages in at least one of the processors and can be accessible on at least one of the devices according to assignments determined by management. All documentation that can be collected throughout the system can be sorted in the driver or vehicle categories. The document storage can sort all data according to processes that collected the information to allow for a streamlined retrieval process. The document storage can also be capable of capturing photos for items needed.

Document storage can store any pertinent vehicle or driver information. A non-exhaustive list of documents includes driver input logs, log books, inspection videos and reports, accident reports, accident history, delivery schedules, delivery receipts, bills of lading, job histories, fuel receipts, fuel logs, mileage logs, odometer readings, location information, drivers licenses, driver medical information, driver certifications, repair receipts and logs, insurance information, vehicle registration information, vehicle permits, and the like. The document storage is a repository for storing pertinent information in a single, easily accessible, and organized location.

The term "driver" as used herein can refer to a human that operates a vehicle that provides transportation, cargo, or remote viewing, such as a pilot of a drone. A driver can be a truck driver, a pilot of a commercial aircraft, a car driver, a cab driver, a boat driver, a captain. In embodiments, a driver can include a robot with artificial intelligence, such as onboard computers of cars that drive, or park themselves.

The term "accident tracker" as used herein can refer to a step by step process to instruct the driver through correct procedures when an accident occurs. The accident tracker program can consist of the following do not admit fault, check for injuries, call dispatch/911, take video/photos of location and property damage, gather information on person(s) involved and witness(es) involved, take photos/video of others involved in accident, record video of person(s) and witness(es) involved, and accident loss description. Once each step is complete, the accident tracker can create an electronic claim summary file that can be emailed to management, a safety manager, a mechanic, or combinations thereof and can be stored in at least one of the plurality of processors. The benefit of the accident tracker is to provide simple steps to follow each time an accident occurs to assure reporting details can be completed accurately and includes all the details needed to sure up the claims handling process.

The term "driver fuel usage tracker" as used herein can refer to a part of the method that can track the amount of fuel used by a vehicle and the mileage at the time of refueling. This information can then be used to calculate the fuel usage per mile. When a vehicle is refueled, the driver can input the amount of fuel used. The inspection device can create a date and time stamp. In embodiments, the inspection device can be capable of capturing a photo of the receipt, but is not necessary.

The term "driver log book" as used herein can refer a log book that can be used in conjunction with the statuses and can be used to track the time spent in one category, such as off-duty, sleeper birth, driving, and on-duty not driving. The driver, dispatcher, safety director, manager, or combinations thereof can access the log book for the driver. In embodiments, the driver log book can be presented in a format permissible by governmental entities. When the driver log book is viewed, it can indicate the amount of time spent in each category.

The term "global positioning system" as used herein can refer to a satellite navigation system that provides location and time information in all weather conditions, anywhere on or near the Earth where there is an unobstructed line of sight to four or more GPS satellites or a triangulation system using cellular network allowing client devices locations to be determined using vectors from cellular towers, based on Wi-Fi signals or other similar types of networks.

The term "log book status" as used herein can refer to a driver status as recorded in the log book in the administrative data storage. Log book status can be on-duty, off-duty, driving or sleeping.

In embodiments, the at least inspection device can include computer instructions to instruct the inspection processor to transmit a location of the inspection device and compare the transmitted location to the global positioning system using either the administrative processor or the inspection device, wherein the compared location information is then transmitted to the inspection device, the administrative data storage or combinations thereof.

In other embodiments, the method of fleet management can transmit a location of at least one vehicle, the inspection device, or combinations thereof and compare the transmitted location to the global positioning system using either the administrative processor or the inspection device, wherein the compared location information is then transmitted to the inspection device, the administrative data storage, the customer client device or combinations thereof. In this embodiments, the global positioning system can be used to compare the transmitted location to the log book status, which can in turn validate the driver log book, the log book status and the location of the at least one vehicle, the inspection device, or combinations thereof.

The term "network" as used herein can refer to a global communication network, the internet, a cellular network, a local area network, a wide area network, a peer to peer network, a satellite network, a global positioning system or combinations thereof.

In embodiments, the term "repair tracker" can provide a tracker with digital graphic elements that can be displayed on the inspection device, the mechanic device, the customer client device, or combinations thereof, which can provide indications and updates regarding repairs done at the time of service or inspection of the vehicle.

The term "at least one safety class or safety classes" as used herein can refer to at least one safety class, such as a virtual safety class, which can be transmitted to an inspection device for viewing and requiring a response from a person, such as a driver, as a result of viewing the safety class. The at least one safety class can be directed to vehicle braking techniques, use of mirrors, loading of vehicles, site awareness, drug and alcohol usage while driving, sleep apnea awareness, monitoring of fuel usage, what to do in the event of an accident and similar topics. The at least one safety class can also incorporate a safety assessment or a safety exam or test for the driver or viewer.

The term "vehicle or vehicles" as used herein can refer to at least one vehicle, which in embodiments can be a manned vehicle. In embodiments, the term "vehicles" can also refer to an unmanned vehicle. In embodiments, the term "vehicles" can refer to a plurality of vehicles, such as a fleet of vehicles. The term "vehicles" can refer to a moveable object which can be self-propelled and which can transport persons, gear, materials, and products, or vehicles which can act as surveillance vehicles.

The term "vehicle identification" as used herein can refer to a number, such as a VIN for a car, an alpha-numerical combination, a boat name, symbols, or color indicator for a vehicle, such as "red truck or blue truck". Vehicle identification can be in the form of a bar code, QR code, an electronic identifier, such as an RFID chip or a frequency. Vehicle identification can include a VIN number, assigned vehicle number, a make of vehicle, such as a truck or a trailer, a power supply, a model, a year of manufacture and additional details, such as weight or rating can be included.

The term "vehicle inspection information" as used herein can refer to inspection of the status of the vehicle, such as condition and operability, such as driver side headlight light out, slow oil leak, spare is flat, reflective tape is gone, mud flaps are damaged, body panels are damaged, frame is cracked, and windshield is cracked. In embodiments, the vehicle inspection information can include an electronic driver vehicle inspection report, such as an EDVIR, E-DVIR or DVIR.

The term "vehicle mileage tracker" as used herein can refer to a part of the fleet management method that can track and calculate the vehicle mileage. The driver can input the mileage at predetermined points such as at the time of fueling, crossing state lines, and/or arrival or departure from delivery or terminal locations. The vehicle mileage tracker can then report this information back to at least one of the processor. In embodiments, a trip meter can be used which can have an elapsed time to show how much time is left until the driver needs to be put out of service.

The term "vehicle trip status" as used herein can refer to a part of the method that can capture the vehicle location and current status. The status can be updated by the driver and the inspection device communicates the information to dispatch and management, such as to the customer client device. The descriptions used within the vehicle trip status program can include, but is not limited to: off duty, post trip, pre-trip, arrived, waiting, waiting with off-duty exemption, in-route, on duty and problem. Each time the status is changed by the driver, the dispatch, management, or combinations thereof can be notified, such as through the customer client device. The vehicle trip status can be used in conjunction with the driver log book to update the log book for the following categories, which include, but are not limited to: off duty, sleeper birth, driving, and on duty not driving.

The term "work status" when referring to the driver can refer to one of the following: a driver in route, a driver is starting a route, a driver is completing a route, a driver is waiting while en-route, a driver is out of service due to mechanical difficulties. For example, a driver of a tractor trailer indicates on Tuesday, Feb. 10, 2015 at 5:55 pm he is waiting while en-route to deliver beach chairs to a store in Maine due to a snowstorm. Work status can include a driver has "arrived". Work status can include that the driver is experiencing a problem, such as a tire blow out.

The term "work status change" as used herein can refer to the point in time when a driver changes status for example, a driver can change status from driver en-route to driver waiting, or driver starting route changes to driver has completed route, or the status driver can be waiting while en-route has a work status change when driver is out of service due to mechanical difficulties.

The various devices discussed above, such as the inspection device, the mechanic device, or the customer client device can comprise a means for the user of the device to be tracked. This tracking can be accomplished by means of a login and unique password for each user, or can require identity verification upon a user of the device performing an action or to allow a user access to the device. The identity verification can be the entry of a password, a signature by the user, a biometric identification such as a thumbprint or a retinal scan, or any reasonable process for verifying the user of the device.

Turning now to the Figures, FIG. 1 depicts an overview of equipment needed to implement the fleet management method according to one or more embodiments.

The fleet management system 6 can have a plurality of processors and a plurality of data storages.

In embodiments, the at least one processor can be a computer, a laptop, a desk top computer, a client device, such as a cellular telephone or a smart phone, a tablet computer, or a similar device capable of at least two way communications.

The fleet management system 6 can have an administrative processor 10 in communication with an administrative data storage 12 via a network 14.

At least one inspection device 16a and 16b can be in communication with the administrative processor 10 via the network 14.

At least one mechanic device 24a, 24b, 24c and 24d can be in communication with the administrative processor 10 via the network 14.

In embodiments, the administrative processor 10 can communicate directly to or through the network 14 to a dispatcher processor 32 and to a vehicle management processor 30.

The at least one inspection device 16a can be used for inspecting a first vehicle 20a and the at least one inspection device 16b can be used for inspecting a second vehicle 20b.

The at least one inspection device 16a can be configured to receive and transmit to the administrative processor 10 a driver identification and a vehicle identification for a vehicle.

The at least one inspection device 16a can be configured to collect and transmit to the administrative processor the driver identification, the vehicle identification, and the vehicle inspection information.

In embodiments, the vehicle management processor 30 can communicate directly with the network 14.

In embodiments, the dispatcher processor 32 can communicate with the administrative processor 10 and the vehicle management processor 30.

In embodiments, the at least one inspection device 16a can communication with a global positioning system 8, which can communicate with the administrative processor 10.

FIG. 2 depicts the at least one inspection device usable with the method according to one or more embodiments.

The at least one inspection device 16a is depicted with an inspection display 40 and an inspection processor 42, which can be connected to the inspection display 40. The inspection processor 42 can also communicate with an inspection data storage 44.

In other embodiments, the inspection processor 42 can communicate directly with the administrative processor.

The inspection data storage 44 can contain vehicle identification 45, a vehicle maintenance tracker 50, an accident tracker 80, a driver fuel usage tracker 82, a vehicle mileage tracker 84, a driver log book 86, a vehicle trip status 88, and document storage 90.

The at least one inspection device 16a can include computer instructions 206 to instruct the inspection processor to transmit a location of the inspection device and compare the transmitted location to the global positioning system using either the administrative processor or the inspection device, wherein the compared location information is then transmitted to the inspection device, the administrative data storage or combinations thereof.

The fleet management method can further comprise computer instructions 207 to compile and store location information continuously or periodically to calculate a total traveled distance per time period, per trip, or other defined interval. This information can further be analyzed and presented in various formats as desired. For example, the administrative data storage can comprise computer instructions 208 to calculate the distance traveled within a jurisdiction, which can be a defined geographical area. The geographical area can be defined by a user of the fleet management system for desired information, and may include areas such as countries, states, counties, or any other area designation.

FIGS. 3A-3C depict a vehicle maintenance tracker usable with the method according to one or more embodiments.

The vehicle maintenance tracker 50 can be stored in either the inspection device or in the administrative data storage of the administrative processor. In embodiments wherein there is a central maintenance tracker in the administrative data storage, the inspection device can access and display information from the maintenance tracker.

The inspection device or the administrative data storage can be configured to receive information into the vehicle maintenance tracker 50 for performing at least one of: a pre-trip inspection, a roadside inspection, a post-trip inspection, or an ad-hoc inspection for a vehicle with a vehicle identification.

FIG. 3A provides a detail of the vehicle maintenance tracker 50 for performing a pre-trip inspection 51.

The vehicle maintenance tracker 50 can maintain vehicle identification 45 and a driver identification 47.

Driver identification 47 can include but is not limited to a driver's name, a driver's address, a driver's license number, a state the driver's license is issued in, an employee number, and combinations thereof.

The vehicle maintenance tracker 50 can include, but is not limited to a pre-trip time stamp 52, a pre-trip list of inspection points 53, a pre-trip stored list of repair requests 54, a pre-trip alert for needed repairs based on stored list of repair requests 55, a pre-trip vehicle out of service date 56, and pre-trip alerts that the vehicle is repaired and ready for service 57.

In embodiments, the vehicle maintenance tracker can be created from computer instructions in the administrative data storage that stores the information and instructs at least one of the processors to generate the following: the inspection with a time stamp, a list of inspection points, a stored list of repair requests, an alert for needed repairs based on the stored list of repair requests, a vehicle out of service date, and an alert that a vehicle is repaired and ready for service.

FIG. 3B provides a detail of the vehicle maintenance tracker 50 for performing a roadside inspection 58.

The vehicle maintenance tracker can maintain the vehicle identification 45 and the driver identification 47.

The vehicle maintenance tracker can include, but is not limited to a roadside time stamp 59, a roadside list of inspection points 60, a roadside stored list of repair requests 61, a roadside alert for needed repairs based on stored list of repair requests 62, a roadside vehicle out of service date 63, and roadside alerts that the vehicle is repaired and ready for service 64.

FIG. 3C provides a detail of the vehicle maintenance tracker 50 for performing a post-trip inspection 65.

The vehicle maintenance tracker 50 can maintain the vehicle identification 45 and the driver identification 47.

The vehicle maintenance tracker 50 can include, but is not limited to a post-trip time stamp 66, a post-trip list of inspection points 67, a post-trip stored list of repair requests 68, a post-trip alert for needed repairs based on stored list of repair requests 69, a post-trip vehicle out of service date 70, and post-trip alerts that the vehicle is repaired and ready for service 71.

In embodiments, the ad-hoc inspection can be done at any time, such as at the time of the pre-trip inspection, the roadside inspection, the post-trip inspection, or combinations thereof.

In embodiments, the administrative data storage and the mechanic device can be configured to receive information into the mechanic maintenance tracker in the administrative data storage regarding maintenance performed for the at least one vehicle with vehicle identification using at least one of: the pre-trip inspection, the post-trip inspection, the roadside inspection, the ad-hoc inspection, or combinations thereof.

In embodiments, the administrative data storage and the mechanic device can be configured to use computer instructions in the administrative data storage to instruct at least one of the processors to generate an alert when the vehicle with the vehicle identification is repaired.

FIG. 4 depicts the at least one mechanic device usable with the method according to one or more embodiments.

The mechanic device 24a can have a mechanic display 100 and a mechanic processor 102, which can be in communication with a mechanic data storage 104.

The mechanic data storage 104 can include, but is not limited to the vehicle identification 45, the driver identification 47, a pre-trip alert for needed repairs based on stored list of repair requests 55, a roadside alert for needed repairs based on stored list of repair requests 62, a post-trip alert for needed repairs based on stored list of repair requests 69, and an ad-hoc alert for needed repairs based on stored list of repair requests 101.

The mechanic data storage 104 can contain a mechanic repair initiation 106 and a mechanic inspection initiation 108.

The mechanic data storage 104 can include a schedule of repairs by the mechanic 112, a projected vehicle return to service date 114, and mechanic identification 116.

In embodiments, the at least one mechanic device can be connected to the network, and the at least one mechanic device can be configured to receive and transmit to the administrative processor the mechanic identification 116 and the vehicle identification 45. In embodiments, the at least one mechanic device can be configured to collect and transmit to the administrative processor: (i) vehicle repair information for the vehicle identification; (ii) vehicle in service dates for the vehicle identification; (iii) vehicle out of service dates for the vehicle identification; and (iv) vehicle return to service dates for the vehicle identification.

In embodiments, the mechanic device can store information about a mechanic repair initiation date and a vehicle return to service date. The mechanic data storage can include computer instructions to generate and transmit or display a mechanic generated alert 110.

Figure 5B:
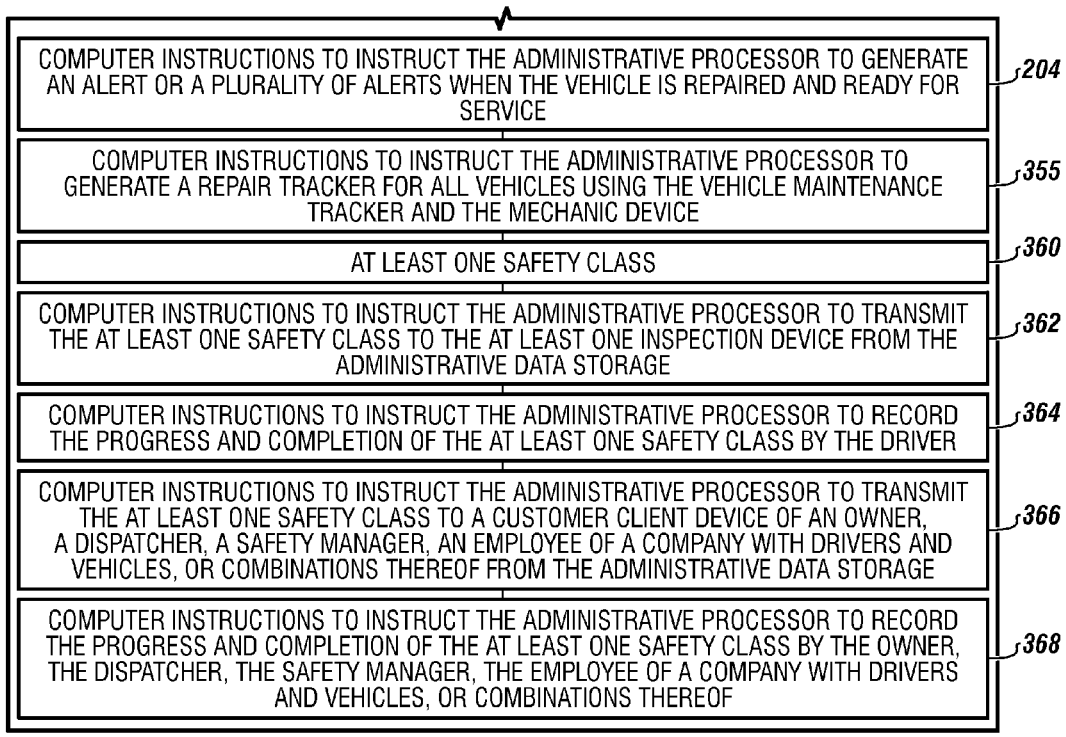

FIGS. 5A and 5B depict an administrative processor usable with the method according to one or more embodiments.

The administrative processor 10 can be connected to or in communication with an administrative display 11 and the administrative data storage 12.

The administrative data storage 12 can include, but is not limited to the vehicle identification 45, the driver identification 47, the vehicle maintenance tracker 50, the pre-trip alert for needed repairs based on stored list of repair requests 55, the roadside alert for needed repairs based on stored list of repair requests 62, the post-trip alert for needed repairs based on stored list of repair requests 69, the ad-hoc alert for needed repairs based on stored list of repair requests 101, the accident tracker 80, the driver fuel usage tracker 82, the vehicle mileage tracker 84, the driver log book 86, the vehicle trip status 88, and document storage 90.

The administrative data storage 12 can also comprise an application program interface ("API") 13, to allow separate computer programs to access the data within. For example an API could allow accounting programs to access billable hours or cost information, the API could allow enterprise resource planning software to access repair information. Any computer program needing data from the fleet management system can be granted access and permissions through the API.

In embodiments, the driver log book 86 can be stored on the administrative data storage, the at least one of the inspection device or combinations thereof.

The driver log book 86 can be software, which can include computer instructions configured to automatically update as a driver of a vehicle of the fleet management system changes work status and automatically converts the work status of the driver to a log book status and stores the log book status, and wherein the at least one inspection device or the administrative data storage can be configured to record a location and time of work status change. In this embodiment, the at least one vehicle of the fleet management system can automatically communicate using the network, indicating a status as: on duty, off duty, driving or sleeping which can then recorded in the driver log book.

The administrative data storage can contain computer instructions to instruct the processor to generate the alert or the alerts when the vehicle is repaired and ready for service. In embodiments, computer instructions can be stored in the mechanic data storage, located in the mechanic device. In other embodiments, computers instructions can be stored in any of the data storages and are not limited to any single data storage.

The administrative data storage 12 can contain the mechanic generated alert 110. In embodiments, the mechanic generated alert can be stored in the administrative data storage once the mechanic generated alert is transmitted.

In embodiments, the administrative data storage can include but is not limited to the mechanic repair initiation 106, the mechanic inspection initiation 108, the schedule of repairs by the mechanic 112, the projected vehicle return to service date 114, a mechanic identification 116, and a vehicle management identification 120.

In embodiments, the administrative data storage can contain computer instructions 124 to instruct the administrative processor to generate an alert that the schedule of repairs won't be met.

The administrative data storage 12 can contain computer instructions 202 to instruct the administrative processor to transmit or display the mechanic generated alert when the vehicle is repaired and ready for service.

In other embodiments, computer instructions 202 can be stored in the mechanic data storage, located in the mechanic device. In other embodiments, computers instructions 202 can be stored in any of the data storages and are not limited to any single data storage.

In embodiments, the mechanic generated alert can be generated by the at least one mechanic device and transmitted or displayed to the at least one of the inspection device, the at least one customer client device, or combinations thereof.

The administrative data storage can contain computer instructions 204 to instruct the administrative processor to generate an alert or a plurality of alerts when the vehicle is repaired and ready for service. In embodiments, the generated alert can be transmitted by the fleet management system to the at least one of the inspection device, the at least one customer client device, at least one mechanic device, or combinations thereof.

In other embodiments, computer instructions 204 can be stored in the mechanic data storage, located in the mechanic device. In other embodiments, computers instructions 204 can be stored in any of the data storages and are not limited to any single data storage.

In embodiments, the administrative data storage 12 can contain computer instructions 355 to instruct the administrative processor to generate a repair tracker for all vehicles using the vehicle maintenance tracker and the mechanic device.

In embodiments, the administrative data storage 12 can contain at least one safety class 360.

The administrative data storage 12 can contain computer instructions 362 to instruct the administrative processor to transmit the at least one safety class to the at least one inspection device from the administrative data storage.

In embodiments, the computer instructions can instruct the administrative processor to display class materials, such as photos, text, video, audio and the like. In embodiments, the computer instructions can instruct the administrative processor to provide tests and requirements, such as state motor vehicle tests and requirements.

The administrative data storage 12 can contain computer instructions 364 to instruct the administrative processor to record the progress and completion of the at least one safety class by the driver. In embodiments, these computer instructions can present a gauge or meter for one or more drivers showing a percentage of completeness of the least one class on the administrative display.

In embodiments, a clock can be used showing how much time is left for the driver to complete the at least one safety class without having to restart the class.

The administrative data storage 12 can contain computer instructions 366 to instruct the administrative processor to transmit the at least one safety class to the at least one customer client device of an owner, a dispatcher, a safety manager, an employee of a company with drivers and vehicles, or combinations thereof from the administrative data storage.

The administrative data storage 12 can contain computer instructions 368 to instruct the administrative processor to record the progress and completion of the at least one safety class by the owner, the dispatcher, the safety manager, the employee of a company with drivers and vehicles, or combinations thereof FIG. 6 depicts a customer client device usable with the method according to one or more embodiments.

The customer client device 29 can be connected to or in communication with a vehicle management display 31, a vehicle management processor 30 with a vehicle management data storage 119.

In embodiments, the vehicle management processor 30 can be controlled by the transportation company or the owner of the vehicles being maintained and inspected.

The vehicle management data storage 119 can include but is not limited to the vehicle identification 45, the driver identification 47, the vehicle maintenance tracker 50, the pre-trip alert for needed repairs based on stored list of repair requests 55, the roadside alert for needed repairs based on stored list of repair requests 62, the post-trip alert for needed repairs based on stored list of repair requests 69, the ad-hoc alert for needed repairs based on stored list of repair requests 101, the accident tracker 80, the driver fuel usage tracker 82, the vehicle mileage tracker 84, the driver log book 86, the vehicle trip status 88, and document storage 90.

The vehicle management data storage 119 can include but is not limited to the mechanic repair initiation 106, the mechanic inspection initiation 108, the schedule of repairs by the mechanic 112, the projected vehicle return to service date 114, the mechanic identification 116, and the vehicle management identification 120.

In embodiments, the vehicle management data storage 119 can contain the mechanic generated alert 110.

The vehicle management data storage 119 can contain computer instructions 124 to instruct the vehicle management processor 30 to generate an alert that the schedule of repairs won't be met.

The vehicle management data storage 119 can contain computer instructions 125 to instruct the vehicle management processor 30 to generate and transmit or display an alert when the at least one vehicle is repaired and ready for service.

The vehicle management data storage 119 can contain computer instructions 126 computer instructions 126 to instruct the vehicle management processor to generate and transmit or display a vehicle return to service date.

Figure 7:
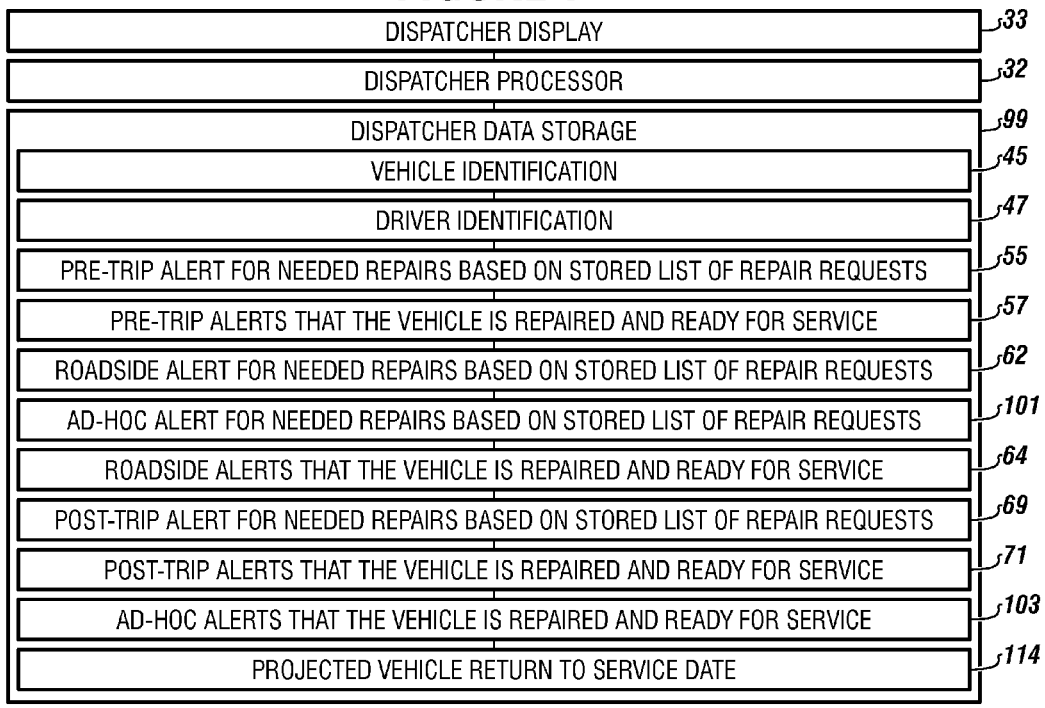
FIG. 7 depicts a dispatcher processor usable with the method according to one or more embodiments.

FIG. 7 depicts a dispatcher processor usable with the method according to one or more embodiments.

The dispatcher processor 32 can be connected to or in communication with a dispatcher display 33 and a dispatcher data storage 99.

The dispatcher data storage 99 can contain, but is not limited to the vehicle identification 45, the driver identification 47, the pre-trip alert for needed repairs based on stored list of repair requests 55, the roadside alert for needed repairs based on stored list of repair requests 62, the post-trip alert for needed repairs based on stored list of repair requests 69, and the ad-hoc alert for needed repairs based on stored list of repair requests 101.

The dispatcher data storage 99 can contain, but is not limited to the pre-trip alerts that the vehicle is repaired and ready for service 57, the roadside alerts that the vehicle is repaired and ready for service 64, the post-trip alerts that the vehicle is repaired and ready for service 71, and the ad-hoc alerts that the vehicle is repaired and ready for service 103.

The dispatcher data storage 99 can contain the projected vehicle return to service date 114.

FIG. 8 depicts the method according to one or more embodiments.

The method can include forming a vehicle maintenance tracker for the at least one vehicle and storing the vehicle maintenance tracker in an administrative data storage, as illustrated by box 802.

The method can include performing a vehicle inspection on the at least one vehicle using an inspection device connected to a network to form vehicle inspection information, as illustrated by box 804.

The method can include identifying services needed on the at least one vehicle, as illustrated by box 806.

The method can include transferring the vehicle inspection information from the inspection device to the vehicle maintenance tracker, as illustrated by box 808.

The method can include transferring the vehicle inspection information to a mechanic for verification of services needed on the at least one vehicle, as illustrated by box 810.

The method can include providing to the vehicle maintenance tracker from the mechanic at least one of: an acknowledgment, mechanic inspection information, vehicle repair information, a schedule for vehicle service, a vehicle in service date, a vehicle out of service status, and a vehicle return to service date based on the schedule for vehicle service, as illustrated by box 812.

The method can include forming an accident tracker and receiving accident information from at least one of: a driver, the at least one vehicle, or an accident related third party and communicating the accident information to the vehicle maintenance tracker, as illustrated by box 828.

The method can include forming a driver fuel usage tracker and receiving driver fuel usage information from at least one of: a driver, the at least one vehicle, or a fuel dispensing party and communicating the driver fuel usage information to the vehicle maintenance tracker, as illustrated by box 830.

The method can include connecting a global positioning system to the driver fuel usage tracker, which can be used to validate a driver fuel usage, as illustrated by box 832.

The method can include forming a vehicle mileage tracker and receiving vehicle miles traveled information for the at least one vehicle from at least one of: a driver or the at least one vehicle and communicating the vehicle miles traveled information to the vehicle maintenance tracker, as illustrated by box 834.

The method can include connecting a global positioning system to the vehicle mileage tracker, which can be used to validate a vehicle location, as illustrated by box 836.

The method can include calculating a traveled distance for a jurisdiction, wherein the jurisdiction is a defined geographic area, as illustrated by box 838.

For example, the vehicle mileage tracker can have record of the total miles traveled by a specific vehicle. The global positioning system can be used to determine a vehicle location during the times of travel. When a specific geographic area or jurisdiction is specified, this information can be used in conjunction to calculate the miles traveled in that jurisdiction.

The method can include forming a driver log book, wherein the driver log book can communicate with the vehicle maintenance tracker to track and record a change in a work status of a driver, as illustrated by box 840.

The method can include forming document storage, for storing documents related to the at least one vehicle, as illustrated by box 842.

In embodiments, at least one of the data storages can produce an executive dashboard, which can monitor and display vehicle speed tracking, vehicle starts and stops, vehicle acceleration, predictive modeling on accidents for this vehicle based on acceleration, starts, stops, sustained speeds, deceleration, and provide a comparison of quantities of vehicle performed right turns vs. vehicle performed left turns.

In embodiments, the executive dashboard can monitor and display vehicle information simultaneously to the at least one inspection device, the at least one customer client devices, or combinations thereof. In embodiments, the information being monitored and displayed can then be recorded on or save in at least one data storage, such as the administrative data storage.

As an illustrative example to use the method, each driver of the fleet can have an inspection device, such as a cellular phone. The driver can input a vehicle identification number, which for this company is Gorilla 1234AA. The driver can also perform a pre-trip inspection looking at, but not limited to tire pressure, tire tread depth, lights all operating, presence or lack of reflective tape, oil pressure, fuel level, oil leaks, and presence or lack of mudguards, brake line condition using the software application on his cellular phone, and combinations thereof. The driver can identify that a front high beam light is not operating and then can transmit the entire inspection information to the administrative processor using the network.

The administrative processor can be owned and controlled by the fleet management company. The vehicle inspection information along with the vehicle identification can be stored in the vehicle maintenance tracker in the administrative data storage associated with the administrative processor.

In this example, three mechanics each with a device can be in communication with the administrative processor. The administrative processor can select one of the three mechanics and automatically transmit the vehicle inspection information to the mechanic device, such as a cellular phone.

The mechanic device can then automatically transmit a schedule for vehicle service to the vehicle maintenance tracker.

The schedule for vehicle service can be displayed on the vehicle maintenance tracker, which can be viewed by the driver with the inspection device at the same time as the mechanic for real time simultaneous viewing concerning the vehicle.

As another illustrative example of the method, the method can include performing a vehicle inspection on an airplane, by inspecting the engine and the passenger compartment using an inspection device and identifying that the engine starter, engine alternator, and engine mounts need to be replaced on the engine and that three seats need to be recovered due to tears, which is the vehicle inspection information identifying the type of services needed on the vehicle.

The method can involve transferring the engine and seat information as vehicle inspection information from the inspection device into the vehicle maintenance tracker in the administrative data storage using the network while simultaneously prioritizing the types of services needed. In this case, the repair of the engine can be listed as a group 1 priority and the seat repairs can be listed as a group 2 priority.

The method can include transferring the group 1 and group 2 prioritized types of services needed on the vehicle to the mechanic for verification of the types of services. The mechanic can use a networked camera to verify the group 1 services, which are of a higher priority than group 2, but does not bother with the group 2 services.

The method can involve the mechanic providing the verification of the engine repairs to the vehicle maintenance tracker while the vehicle maintenance tracker automatically generates both (1) vehicle repair information prioritized by importance of services needed to operate the vehicle and (2) a schedule for vehicle service prioritized by importance of services needed to operate the vehicle showing, such as in this example that the engine starter requires 2 days of service, the engine alternator requires 1 day of service, and the engine mounts require 1 week for service.

While these embodiments have been described with emphasis on the embodiments, it should be understood that within the scope of the appended claims, the embodiments might be practiced other than as specifically described herein.

What is claimed is:

1. A method for fleet management for at least one vehicle, the method for fleet management comprising:
  a. forming a vehicle maintenance tracker for the at least one vehicle and storing the vehicle maintenance tracker in an administrative data storage;
  b. performing a vehicle inspection on the at least one vehicle using an inspection device connected to a network to form vehicle inspection information;
  c. transferring the vehicle inspection information from the inspection device to the vehicle maintenance tracker;
  d. transferring the vehicle inspection information to a mechanic for verification of services needed on the at least one vehicle;
  e. providing to the vehicle maintenance tracker from the mechanic at least one of:
    (i) an acknowledgment;
    (ii) mechanic inspection information;
    (iii) vehicle repair information;
    (iv) a schedule for vehicle service;
    (v) a vehicle in service date;
    (vi) a vehicle out of service status; and
    (vii) a vehicle return to service date based on the schedule for vehicle service;
  f. transmitting at least one safety class to a driver, a dispatcher, a safety manager, or an employee; and
  g. recording progress and completion of the at least one safety class by the driver, the dispatcher, the safety manager, or the employee.

2. The method for fleet management of claim 1, wherein performing the vehicle inspection further comprises identifying services needed on the at least one vehicle using the vehicle inspection information.

3. The method for fleet management of claim 1, wherein the vehicle repair information is prioritized by importance of services needed on the at least one vehicle, wherein the prioritization is determined by at least one of: a driver, a mechanic or a predetermined priority order of importance for services needed on the at least one vehicle stored in the administrative data storage.

4. The method for fleet management of claim 1, wherein the schedule for vehicle service is prioritized by importance of services needed on the at least one vehicle.

5. The method for fleet management of claim 1, further comprising forming an accident tracker in the administrative data storage and receiving accident information from at least one of: a driver, the at least one vehicle, or an accident related third party and communicating the accident information to the vehicle maintenance tracker.

6. The method for fleet management of claim 1, further comprising forming a driver fuel usage tracker in the administrative data storage and receiving driver fuel usage information from at least one of: a driver, the at least one vehicle, or a fuel dispensing party; and communicating the driver fuel usage information to the vehicle maintenance tracker.

7. The method for fleet management of claim 6, further comprising connecting a global positioning system to the driver fuel usage tracker.

8. The method for fleet management of claim 7, wherein the global positioning system is used to validate a driver fuel usage.

9. The method for fleet management of claim 1, forming a vehicle mileage tracker in the administrative data storage and receiving vehicle miles traveled information for the at least one vehicle from at least one of: a driver or the at least one vehicle; and communicating the vehicle miles traveled information to the vehicle maintenance tracker.

10. The method for fleet management of claim 9, wherein the vehicle miles traveled information further comprises a driver identification.

11. The method for fleet management of claim 9, connecting a global positioning system to the vehicle mileage tracker.

12. The method for fleet management of claim 11, wherein the global positioning system is used to validate a vehicle location.

13. The method for fleet management of claim 12, wherein the vehicle mileage tracker is used to calculate a traveled distance for a jurisdiction, wherein the jurisdiction is a defined geographic area.

14. The method for fleet management of claim 1, forming a driver log book, wherein the driver log book communicates with the vehicle maintenance tracker to track and record a change in a work status of a driver.

15. The method for fleet management of claim 1, further comprising forming document storage for storing documents related to the at least one vehicle.

16. The method for fleet management of claim 1, wherein the vehicle inspection comprises at least one of:
  a. a pre-trip, wherein the pre-trip inspection includes at least one of: a pre-trip time stamp, a pre-trip list of inspection points, a pre-trip stored list of repair requests, a pre-trip alert for needed repairs based on the stored list of repair requests, a pre-trip vehicle out of service date, and a pre-trip alert that the at least one vehicle is repaired and ready for service;
  b. a roadside inspection, wherein the roadside inspection includes at least one of: a roadside time stamp, a roadside list of inspection points, a roadside stored list of repair requests, a roadside alert for needed repairs based on the stored list of repair requests, a roadside vehicle out of service date, and a roadside alert that the at least one vehicle is repaired and ready for service; and
  c. a post-trip inspection, wherein the post-trip inspection includes at least one of: a post-trip time stamp, a post-trip list of inspection points, a post-trip stored list of repair requests, a post-trip alert for needed repairs based on the stored list of repair requests, a post-trip vehicle out of service date, and a post-trip alert that the at least one vehicle is repaired and ready for service.

17. The method for fleet management of claim 1, further comprising providing at least one of:
a. a pre-trip alert for needed repairs;
b. a roadside alert for needed repairs;
c. a post-trip alert for needed repairs;
d. an ad-hoc alert for needed repairs;
e. a pre-trip alert that the at least one vehicle is repaired and ready for service;
f. a roadside alert that the at least one vehicle is repaired and ready for service;
g. a post-trip alert that the at least one vehicle is repaired and ready for service;
h. an ad-hoc trip alert that the at least one vehicle is repaired and ready for service;
i. a vehicle return to service date; and
j. a schedule alert that the schedule for vehicle service will not be met.

18. The method for fleet management of claim 1, further comprising connecting a dispatcher processor to the administrative processor via the network, and a dispatcher data storage, wherein the dispatcher data storage comprises:
a. a vehicle identification for the at least one vehicle or a driver identification; and
b. at least one of:
(i) a pre-trip alert for services needed on the vehicle by vehicle identification and by driver identification;
(ii) a roadside alert for services needed on the vehicle by vehicle identification and by driver identification;
(iii) a post-trip alert for services needed on the vehicle by vehicle identification and by driver identification;
(iv) a pre-trip alert by vehicle identification that the at least one vehicle is ready for service;
(v) a roadside alert by vehicle identification that the at least one vehicle is ready for service;
(vi) a post-trip alert by vehicle identification that the at least one vehicle is ready for service; and
(vii) a projected vehicle return to service date by vehicle identification.

19. The method for fleet management of claim 1, further comprising providing an application program interface allowing a computer program to access fleet management data.

\* \* \* \* \*